L. HACHENBERG.
PIPE UNION.
APPLICATION FILED MAR. 17, 1920.
1,396,196.  Patented Nov. 8, 1921.
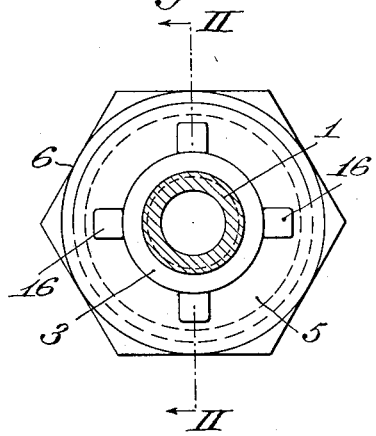
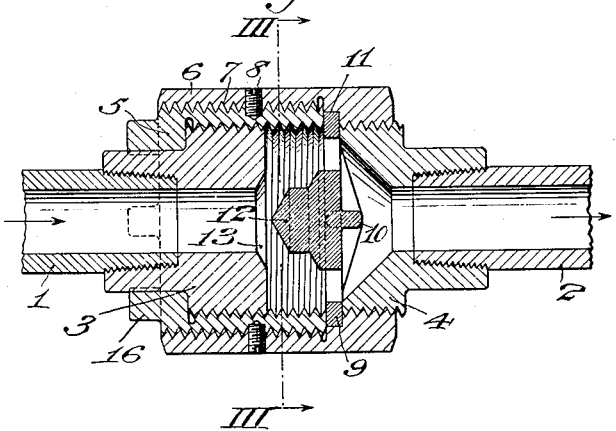
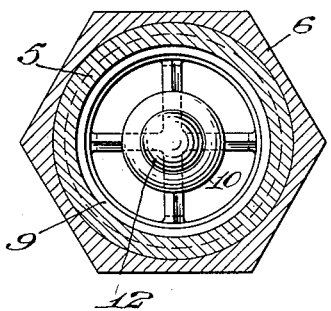
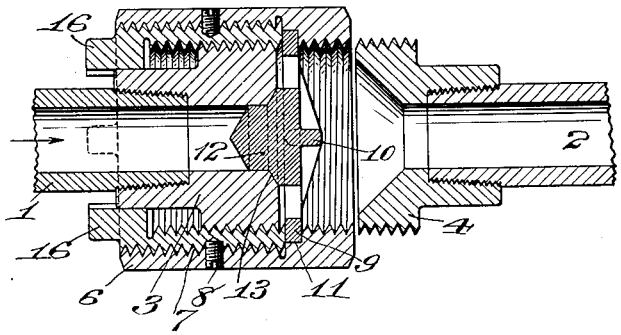
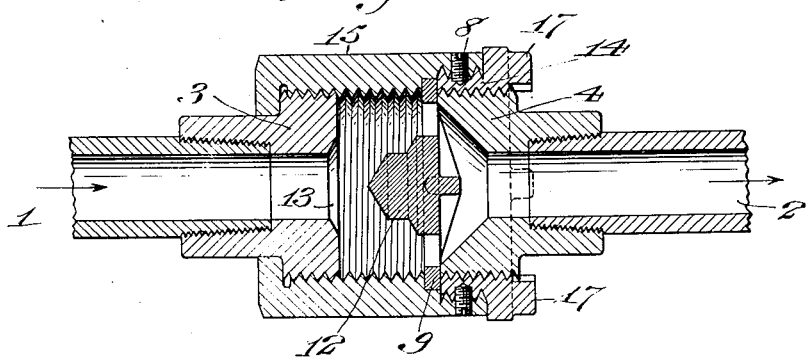

UNITED STATES PATENT OFFICE.

LOUIS HACHENBERG, OF NEW YORK, N. Y.

PIPE-UNION.

1,396,196.  Specification of Letters Patent.  Patented Nov. 8, 1921.

Application filed March 17, 1920. Serial No. 366,681.

*To all whom it may concern:*

Be it known that I, LOUIS HACHENBERG, a citizen of the United States, and resident of the borough of Manhattan, in the city and State of New York, have invented a new and useful Improvement in Pipe-Unions, of which the following is a specification.

In unions as commonly constructed, the flow of the fluid through the pipe line must be shut off at a distant point before two adjacent pipe sections can be uncoupled. This results in considerable annoyance and expense.

The object of my invention is to provide means for automatically closing one of two adjacent pipe sections as the two sections are being uncoupled and for opening the said pipe section as the two sections are being coupled.

My invention preferably includes a valve carried by the collar which is screw-threaded to both pipe sections so that the valve will gradually close or open the one of the pipe sections as the collar is unscrewed from or screwed on to the other pipe section.

A practical embodiment of my invention is represented in the accompanying drawing, in which, Figure 1 represents one embodiment of my invention in end elevation.

Fig. 2 represents a longitudinal section taken in the plane of the line II—II of Fig. 1, the two adjacent pipe sections being shown coupled and the valve open.

Fig. 3 represents a transverse section taken in the plane of the line III—III of Fig. 2.

Fig. 4 represents a view similar to Fig. 2, the adjacent pipe sections being shown uncoupled.

Fig. 5 represents a modified form of union in longitudinal central section.

The two adjacent pipe sections of a pipe line are represented by 1 and 2. The pipe section 1 is provided with a flange member 3 exteriorly screw-threaded, and the pipe member 2 is provided with a flange member 4, also exteriorly screw-threaded.

In the form shown in Figs. 1 to 4 inclusive, the collar which is screw-threaded on to the flange members 3 and 4 of the two adjacent pipe sections is shown as comprising two parts 5 and 6, the part 6 being screw-threaded on to the part 5 as shown at 7, and the two parts pinned together, as for instance, by screws 8.

The periphery of the base 9 of the valve 10 is seated in an inner annular groove 11 in the collar. This valve 10 is provided with a projection 12 which is fitted to enter the bore of the flange member 3 of the pipe section 1 to guide the valve to its seat 13, surrounding the said bore.

The flange members 3 and 4 are threaded in the same direction so that as the collar is turned, it will be screwed along the flange member 3 in one direction or the other as the collar is screwed on to or off from the flange member 4.

As the collar is screwed off from the flange member 4 to uncouple the adjacent pipe sections, the valve will be moved into position to gradually close the pipe section 1. As the collar is turned in the other direction to screw on to the flange member 4 of the pipe section 2, the valve 10 will be gradually opened.

In the form shown in Figs. 1 to 4 inclusive, the inner part 5 of the collar is screwed on to the flange member 3 and the outer part on to the flange member 4, while in the form illustrated in Fig. 5, the inner member 14 of the collar is screwed on to the flange member 4 and the outer member 15 of the collar is screwed on to the flange member 3. This is a reversal of the arrangement shown in Figs. 1 to 4 inclusive. In the form shown in Fig. 5, the two members are secured together after the valve has been placed in its position by the screw or screws 8.

To facilitate the assembly and disassembly of the two parts of the collar in the form shown in Figs. 1 to 4 inclusive, the outer part 6 may be shaped like a nut to receive an ordinary wrench, and the inner part 5 may be provided with lugs 16 to engage a spanner wrench. For the same reason, in the form shown in Fig. 5, the outer part 15 may be shaped like a nut and the inner part 14 may be provided with lugs 17.

From the above description, it will be seen that each union carries its own valve for shutting off and opening the flow of the fluid through the pipe line, thereby eliminating the necessity of closing the pipe line at a distant point.

It is obvious that various changes may be made in the construction, form and arrangement of the several parts without departing from the spirit and scope of my invention; hence I do not wish to limit myself to the particular embodiments herein shown and described, but

What I claim is:—

1. A union for two adjacent pipe sections including a collar having a screw-threaded engagement with both pipe sections, and a valve movable with the collar to automatically close one of the pipe sections as the collar is unscrewed from the other pipe section to uncouple the two pipe sections.

2. A union for two adjacent pipe sections including a collar having a screw-threaded engagement with both pipe sections, and a valve movable with the collar to gradually and automatically close one of the pipe sections as the collar is unscrewed from the other pipe section to uncouple the two pipe sections.

3. A union for two adjacent pipe sections including a collar having a screw-threaded engagement with both pipe sections, and a valve movable with the collar to automatically open one of the pipe sections as the collar is screwed on to the other pipe section.

4. A union for two adjacent pipe sections including a collar having a screw-threaded engagement with both pipe sections, and a valve movable with the collar to gradually and automatically open one of the pipe sections as the collar is screwed on to the other pipe section.

5. A union for two adjacent pipe sections including a collar having a screw-threaded engagement with both pipe sections, and a valve movable with the collar to automatically close or open one of the pipe sections as the collar is unscrewed from or screwed on to the other pipe section.

6. A union for two adjacent pipe sections including a collar having a screw-threaded engagement with both pipe sections, and a valve movable with the collar to gradually and automatically close or open one of the pipe sections as the collar is unscrewed from or screwed on to the other pipe section.

7. A union for two adjacent pipe sections including a collar having a screw-threaded engagement with both pipe sections, and a valve movable with the collar to automatically close one of the pipe sections as the collar is unscrewed from the other pipe section to uncouple the two pipe sections, said valve being provided with a projection which is fitted to enter the bore of the pipe section being closed.

8. A union for two adjacent pipe sections including a collar having a screw-threaded engagement with both pipe sections, one of said pipe sections having a valve seat surrounding its bore, and a valve movable with the collar to automatically close onto said seat as the collar is unscrewed from the other pipe section to uncouple the two pipe sections, said valve being provided with a projection which is fitted to enter the bore of the pipe section being closed before the valve is seated.

In testimony, that I claim the foregoing as my invention, I have signed my name this 15th day of March, 1920.

LOUIS HACHENBERG.